Figure 1:
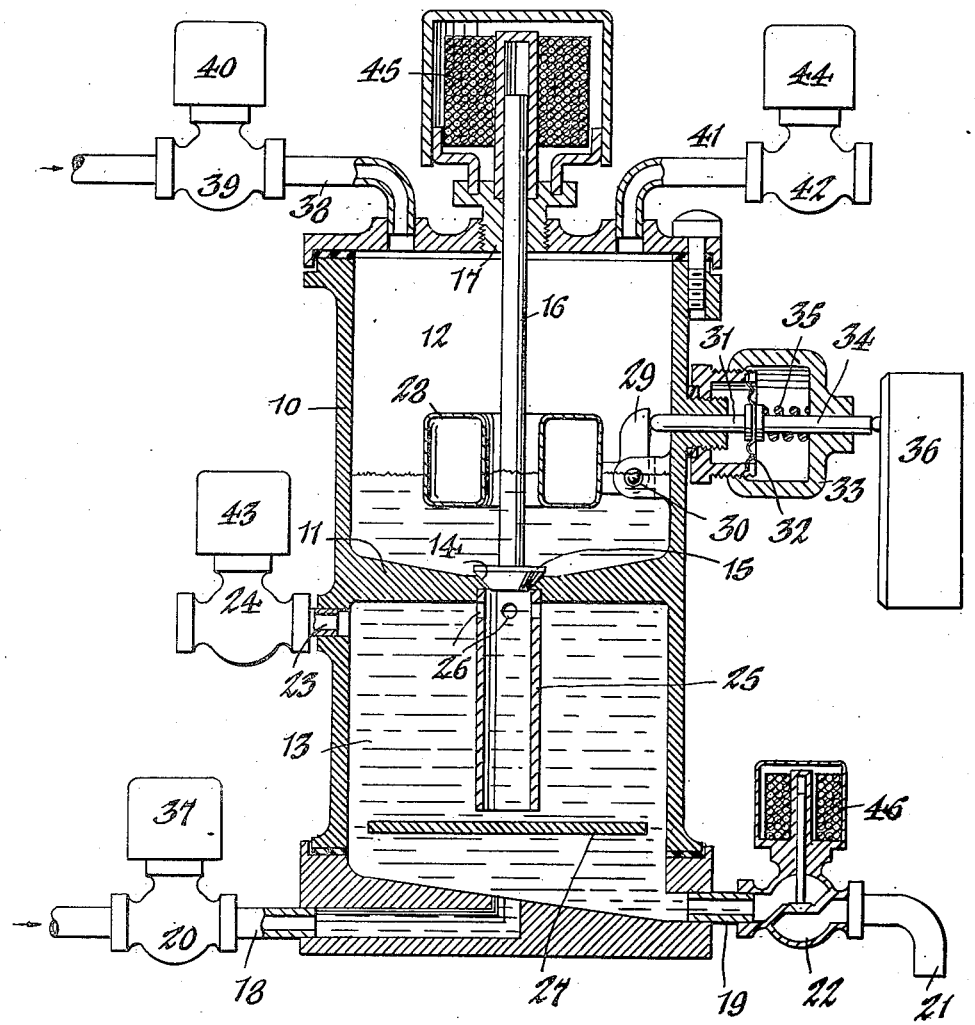

March 12, 1946.  F. H. OSBORNE  2,396,527
DRINK MEASURING DEVICE
Filed July 1, 1943  2 Sheets-Sheet 1

Inventor,
Fred H. Osborne,
by Walter P. Geyer
Attorney.

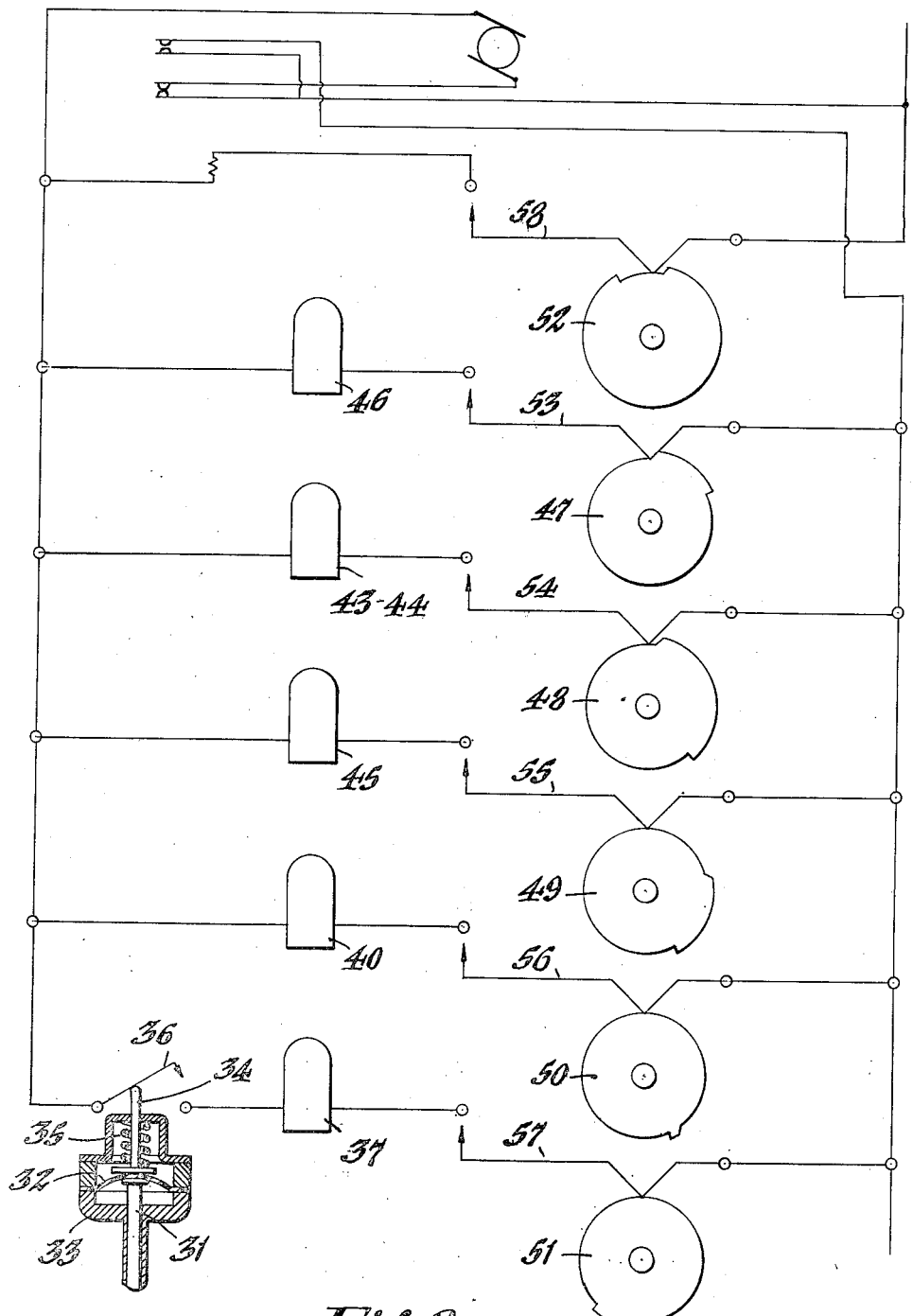

Patented Mar. 12, 1946

2,396,527

UNITED STATES PATENT OFFICE 2,396,527

DRINK MEASURING DEVICE

Fred H. Osborne, Snyder, N. Y., assignor to The Rudolph Wurlitzer Company, North Tonawanda, N. Y., a corporation of Ohio Application July 1, 1943, Serial No. 493,021

4 Claims. (Cl. 225—21)

This invention relates generally to the drink vending art but more particularly to a metering or measuring device designed for use with coin-controlled beverage vending apparatus.

It has for one of its objects to provide a measuring device of this character which is designed to effectually govern by float-controlled means the delivery of a predetermined amount of the beverage to the device.

Another object of the invention is to provide a drink measuring device including a vessel having upper and lower compartments in valve-controlled communication and wherein the lower compartment serves as a measuring chamber and the upper compartment functions as a float-controlling chamber for governing the delivery of a predetermined amount of the beverage to the vessel.

Other features of the invention reside in the construction and arrangement of parts hereinafter described and particularly pointed out in the appended claims.

In the accompanying drawings:

Figure 1 is a sectional view of the measuring device embodying my invention. Figure 2 is a diagrammatic view of a form of timing mechanism employed for the filling and dispensing operations.

Similar characters of reference indicate corresponding parts throughout the several views.

This metering or measuring device has been primarily designed for use with refrigerated beverage dispensing apparatus of the coin-controlled type and wherein, upon the deposit of a coin, a predetermined amount of the beverage is automatically dispensed from the device into a paper cup or like receptacle.

In its preferred construction shown in the drawings, this measuring device consists of a beverage-receiving vessel or container 10 divided by a horizontal partition 11 into communicating upper and lower compartments 12 and 13, respectively, the partition having a port 14 therein to which is applied a downwardly-closing valve 15 having a stem 16 rising therefrom and guided in a bushing 17 fitted in the head of the vessel. The lower compartment 13 constitutes the measuring chamber and is of a size to receive a cupful or other amount of the beverage to be vended, being provided at its lower end with an inlet conduit 18 and an outlet conduit 19. The inlet conduit is adapted to be connected to a beverage supply tank and has a valve 20 interposed therein for controlling the delivery of a predetermined amount of the drink to the vessel, while the outlet conduit terminates in a pouring spout 21 and has a valve 22 therein for controlling the dispensing of the measured drink into a waiting cup. Adjacent its upper end the lower compartment has an atmospheric inlet 23 controlled by a valve 24, and extending axially downward from the partition-port 14 into this compartment is a tube 25 having vent openings 26 at its upper end for forcing the displaced air from the lower compartment into the upper compartment 12 during the filling or charging operation. This vent tube terminates above the bottom of the lower compartment and interposed in the resulting space and over the beverage intake is a baffle 27 which prevents surging of the drink as it enters and rises in the vessel.

The upper compartment functions to govern the admission of a predetermined amount of the beverage to the vessel and for this purpose constitutes a float chamber in which a float 28 is mounted for initiating the closing of the beverage delivery valve 20 when the beverage reaches a predetermined level in such chamber. This float is applied to one arm of a bell crank lever 29 pivoted at 30 to the compartment wall, the other arm thereof being disposed to abut against the inner end of a thrust rod 31 guided in such wall and whose outer end presses against a diaphragm 32 mounted in a housing 33 suitably attached to the vessel. Pressing against the outer face of this diaphragm is a similar thrust rod 34 having a spring 35 thereon which bears at one end against the housing and at its other end against said diaphragm for normally urging the alining rods inwardly. The outer end of the rod 34 is disposed in operative relation to a normally closed micro-switch 36 included in the circuit of a solenoid 37 for governing the closing of the delivery valve 20. When the float reaches a certain level in the compartment 12, it causes the alining rods 31, 34 to be thrust outwardly to open the micro-switch and cause the delivery valve to close.

A source of compressed air, for the purpose of reducing effervescence or heading of the beverage as it is admitted to the vessel, is adapted to be introduced into the upper compartment through a conduit 38 controlled by a valve 39 having a solenoid 40 operatively connected thereto for effecting its opening. This valve is adapted to be opened during the filling operation and the pressure delivered to the upper compartment is lower than that of the pressure under which the beverage is delivered to the vessel. An atmospheric inlet 41 is connected to this upper compartment and is controlled by a valve 42.

The atmospheric inlets 23 and 41 communicating with the compartments 13 and 12, respectively, are normally closed and are adapted to be moved to their open positions by companion solenoids 43 and 44. The partition-port valve 15 is likewise normally closed and is movable to an open position by a solenoid 45. The dispensing valve is adapted to be similarly opened at a predetermined time by a solenoid 46.

To fill the vessel with a charge of the beverage, valves 39 and 15 are opened and air at low pressure enters the upper and lower compartments 12 and 13 until the pressure therein equals that of the air supply, when the valve 39 is closed and the beverage delivery valve 20 is opened. As the beverage rises in the lower compartment, the air is displaced therefrom through the tube-vents 26 and partition-port 14 into the upper compartment, and as the beverage enters the latter the float 28 is raised and at a predetermined level effects the opening of the switch 36 to de-energize the solenoid 37 and cause the delivery valve to close. Thereupon, the partition-port valve 15 closes and remains closed during the dispensing of the beverage from the measuring compartment 13.

When it is desired to pour the measured quantity of the beverage from the vessel, the solenoid-actuated dispensing valve 22 is opened and immediately thereafter the atmospheric inlet valves 24 and 42 are opened to admit atmosphere to the compartments 12, 13. As soon as the measuring compartment 13 is emptied, the partition valve 15 is opened and the dispensing valve is closed, permitting the beverage in the upper compartment to flow into the lower one. This causes the float 28 to be lowered and the switch 36 governed thereby to be closed and in readiness to complete the circuit to the delivery valve controlling solenoid 37. Valves 15, 24 and 42 then close and valve 39 opens to recommence the cycle of again filling the vessel with a measured amount of the drink. The vessel may be completely emptied of its contents by keeping valves 15, 22, 24 and 42 opened until drained.

In practice, a timing mechanism of any suitable construction may be employed for governing the opening of the solenoid-controlled drink-delivery and drink-dispensing valves 20 and 22, the solenoid-controlled atmospheric inlet valves 24 and 42, as well as for governing the solenoid-controlled, partition port valve 15 and the air delivery valve 39. In Figure 2 a diagram of one form of timing mechanism is shown, wherein timing cams 47, 48, 49, 50 and 51 are provided which function to govern the opening and closing of companion switches 53, 54, 55, 56 and 57 included in the circuits of the respective solenoid-actuated valves. Inasmuch as the vent-controlling, solenoid-operated valves 24 and 42 are operated simultaneously, one cam 48 and one switch 54 have been shown associated with the solenoids 43 and 44. Also included in the circuit is a cam 52 for controlling the on and off switch 58 of the device.

I claim as my invention:

1. A measuring device for beverages, comprising a vessel divided by a partition into communicating beverage compartments and having a normally-closed valve therein for controlling the flow of the beverage from one compartment to the other, one of said compartments constituting a measure chamber and having valved inlet and outlet conduits connected thereto for controlling the admission under pressure of a measured quantity of the beverage to and its discharge from the vessel, electromagnetic means operatively connected to said partition-valve for causing its opening, and a liquid level control means in the other of said compartments and having an operative connection to said beverage-measuring valved inlet for closing the same when the beverage reaches a predetermined level therein.

2. A measuring device for beverages, comprising a vessel divided by a partition into communicating upper and lower beverage compartments and having a normally-closed valve therein for controlling the flow of the beverage from one compartment to the other, means connected to said valve for opening it at a predetermined time, valved inlet and outlet conduits connected to the lower compartment for controlling the admission under pressure of a measured quantity of the beverage to and its discharge from the vessel, a valved inlet conduit connected to the upper compartment for controlling the admission of air under pressure thereto during the admission of beverage to the vessel, and a float disposed in said upper compartment and having an operative connection to said beverage-measuring valved inlet for causing its closing when the beverage reaches a predetermined level.

3. A measuring device for beverages, comprising a vessel divided by a partition into communicating upper and lower beverage compartments and having a valve therein for controlling the flow of the beverage from one compartment to the other, valved ports in the upper end of each compartment and opening into the atmosphere, a low pressure air intake in said upper compartment adapted to be opened during the admission of the beverage to the vessel and to be closed when the pressure in the vessel has risen to that of the pressure admitted, valved inlet and outlet conduits connected to the lower compartment for controlling the admission of a measured quantity of the beverage to and its discharge from the vessel, and a float disposed in said upper compartment and having an operative connection to said valved beverage inlet for causing its closing when the beverage reaches a predetermined level.

4. In a beverage vending apparatus, a vessel divided by a partition into communicating upper and lower compartments and having a normally-closed valve therein for controlling the flow of the beverage from one compartment to the other, the lower compartment constituting a measuring chamber and each compartment having a normally-closed valved port therein opening into the atmosphere, a valved intake for introducing a charge of low fluid pressure into the upper compartment, normally-closed, valved inlet and outlet conduits connected to the lower compartment for controlling the admission of a measured quantity of the beverage to and its discharge from the vessel, and control means including electromagnetic valve operating means cooperating with the aforesaid valves and valved elements and adapted for controlling the same at predetermined times during the beverage-charging and discharging operations.

FRED H. OSBORNE.